United States Patent [19]
Mason

[11] Patent Number: 4,736,422
[45] Date of Patent: Apr. 5, 1988

[54] ENCRYPTED BROADCAST TELEVISION SYSTEM

[75] Inventor: Arthur G. Mason, Hampshire, United Kingdom

[73] Assignee: Independent Broadcasting Authority, London, England

[21] Appl. No.: 705,422

[22] PCT Filed: Jul. 2, 1984

[86] PCT No.: PCT/GB84/00237

§ 371 Date: Feb. 22, 1985

§ 102(e) Date: Feb. 22, 1985

[87] PCT Pub. No.: WO85/00491

PCT Pub. Date: Jan. 31, 1985

[30] Foreign Application Priority Data

Jun. 30, 1983 [GB] United Kingdom ............... 8317796
Jul. 22, 1983 [GB] United Kingdom ............... 8319817

[51] Int. Cl.$^4$ ................... H04N 7/167; H04L 9/02
[52] U.S. Cl. ........................ 380/20; 380/21; 380/10
[58] Field of Search ............. 358/114, 122, 123; 178/22.13, 22.08

[56] References Cited

U.S. PATENT DOCUMENTS

| | | | |
|---|---|---|---|
| 4,292,650 | 9/1981 | Hendrickson . | |
| 4,352,011 | 9/1982 | Guillou . | |
| 4,388,643 | 6/1983 | Aminetzah | 178/22.13 |
| 4,484,027 | 11/1984 | Lee et al. | 358/122 |
| 4,531,020 | 7/1985 | Wechselberger et al. | 358/123 |
| 4,531,021 | 7/1985 | Bluestein et al. | 178/22.08 |
| 4,536,791 | 8/1985 | Campbell et al. | 380/10 |
| 4,613,901 | 9/1986 | Gilhousen et al. | 380/20 |

OTHER PUBLICATIONS

WO, A1, 83/01881 (Communications Satellite Corporation), 26 May 1983; see p. 4, Line 1—p. 8, Line 7; p. 9, Lines 25-29.
EP, A1, 0014654 (Telediffusion de France), 20 Aug. 1980, see p. 7, Line 11—p. 8, Line 26.
WO, A1, 83/04154 (Telease), 24 Nov. 1983, see p. 4, Line 5—p. 7, Line 25.

Primary Examiner—Stephen C. Buczinski
Assistant Examiner—Melissa L. Koltak

[57] ABSTRACT

A conditional access system for transmitting and receiving scrambled television signals over-air includes means for addressing each of the receiving apparatus with an over-air signal whereby to permit reception and descrambling of the signal. The transmitter is provided with means for assembling a cipher block of information including a first key for use in descrambling the television signal and information relating to a plurality of users, and means for encyphering the cipher block with a second key which is common to the plurality of users. On reception a receiver applies the second, common keys to the received cipher block, recovers the first key for use in descrambling the signal and the information relating to the respective user and descrambles the television signal. Further, it is proposed to transmit a further key in encrypted form and to use the first key to decrypt the further key which is then used to descramble the television signal. This provides a three level key system which is very secure but by using a common second key for a plurality of users, the time to access each user is short.

23 Claims, 5 Drawing Sheets

ENCRYPTED BROADCAST TELEVISION SYSTEM

The present invention relates to the broadcasting of a television signal in scrambled form and more particularly to a system for enabling the scrambled television signal to be descrambled by authorised viewers only.

It has already been proposed to broadcast scrambled television signals. It has also been proposed to transmit with the scrambled television signal the key for descrambling the signal but the key is encrypted by a further key, an identification key, which is unique to each viewer. In order to decrypt the key the viewer must use his identification key signal and await the broadcast encrypted key.

This is acceptable as long as the number of viewers is not considerable but where one is broadcasting to a considerable number of viewers, for example with satellite broadcasting, it can take a considerable time to access all the viewers with their own encrypted key signal to enable them to descramble the broadcast television signal. While this problem can be overcome by leaving the receiving apparatus powered up continuously, this is not a convenient or inexpensive solution to the problem. Furthermore, when the receiver is first purchased a long waiting time results.

It is an object of the present invention to provide a system for sending encrypted programme entitlements together with a period key to one of a large number of viewers in such a way that he can relatively quickly access the encrypted entitlements and period key which enable him to decypher the scrambled teleivision signal. The period key (P) is also known as the authorisation key (A), but it will be called the period key here.

The present invention provides for sending to a plurality of viewers their individual programme entitlement and the period key, encrypted together as one cipher text block by means of a single distribution key which is used by each viewer to obtain the necessary information for descrambling the television signal. Hence the distribution key and the cipher text block is shared between the plurality of viewers. The sharing of information in this way enables a reduction in the total means of bits that have to be transmitted without compromising the security. The reduction of bits occurs because in a shared block, only one period key needs to be sent and its overhead is shared. If the cipher text block was not shared a separate period key, which needs to be a large number of bits, would have to be appended to each viewers entitlements for reasons of security.

The present invention also provides a secure scrambling system for apparatus for transmitting a scrambled information signal comprising means for generating a first encryption signal (S), first encryption means for encrypting the information signal in accordance with the encrypting key signal (S), means for generating a second encryption key signal (P), second encryption means for encrypting the first encryption key signal in accordance with the second encryption key signal (P), means for generating a third encryption key (D), third encryption means for encrypting the second encryption key signal (P) in accordance with the third encryption key signal (D), and means for transmitting the scrambled information signal and at least the encrypted second encryption scrambling key signal.

Features and advantages of the present invention will become more apparent from the following description of an embodiment thereof given by way of example, in which.

Figure 1:
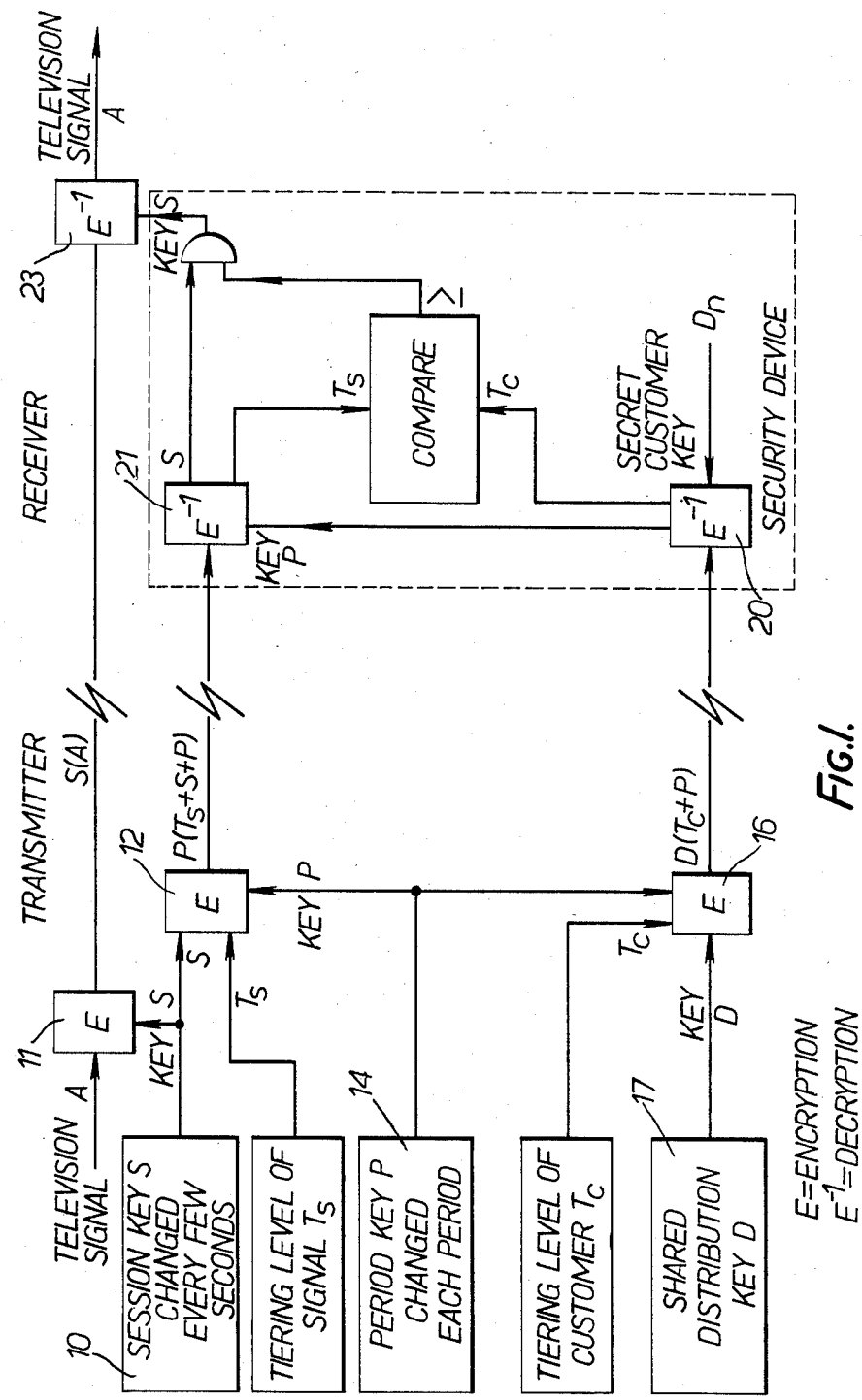
FIG. 1 shows a block diagram of an encryption system.

A preferred embodiment of the present invention will be described in relation to an over-air addressing DBS television encryption system as shown in FIG. 1. A subscriber cannot make use of a conditional access television programme without being in possession of the key that was used for the signal encryption. Furthermore, this key must be kept secret from the customer. Since the broadcast signal, in this case the satellite signal, is common to all subscribers, it follows that the key which is used to cipher the television signal must also be common to everyone. It is generally regarded as insecure to have the same key held in millions of receivers for long periods of time. This is because the key might be discovered by one subscriber who could then distribute it to others customers, who would use it to obtain free television programmes. The only way to avoid this problem is to change this key, which we call the session key (S), at very frequent intervals. The session key (S) is also known in other references as the central word (CW) or the initialisation word (I) or indeed the service key (S). The session key interval may be of the order of one to ten seconds to avoid long access times when different channels are selected. Clearly the only way to send a new session key, that changes every few seconds, is with the broadcast signal. The session key is not sent with the television signal in the clear—it is encrypted with another key that is stored in the receiver. Ultimately, there will have to be a key stored in each receiver that has to be kept secret from the user. One way to achieve this secrecy is to 'bury' the key in an integrated circuit or some device which cannot easily be broken open. Since it is not possible to send new security devices to each customer at regular very short intervals—it follows that the key stored in each device must be unique to each subscriber for reasons of system security. The customer unique key that is stored in the security device will be called the distribution key (D). Since there are a huge number of distribution keys, using this key to distribute the session key to each customer is impractical. This is because the time taken to send the session key would be much longer than the one second duration for which the session key is valid. In order to overcome this problem a period key (P) is introduced. The key is available for some period which is defined by the broadcaster—the period may be as little as one hour or as much as one month. the duration of the period is a compromise between security and the operational difficulties in receiving the key. The period key is common to all subscribers and is used to carry the session key. The period key is itself carried by the customer distribution keys which are stored in each receiver.

FIG. 1 shows schematically how a practical system might be implemented. An information signal A, in this case a television signal, is to be scrambled for transmission. Firstly a session key S is generated by suitable circuitry 10 and this key S is used to scramble the signal A in accordance with the key S as represented by the block 11. So that the key S can be securely sent to a receiver, it is also scrambled in a circuit 12 in accordance with a further scrambling routing identified by a second key P generated by suitable circuitry 14. Both the session key S and the second key P are changed at intervals but the second key need be changed at less frequent intervals than the session key S.

Finally, the second key P is scrambled in a circuit 16 by a third key, the distribution key D, generated by a circuit 17. The scrambled information signal, the scrambled session key and the scrambled second key are then transmitted using any suitable equipment.

In a receiver, the reverse operation is carried out. It is first necessary for a customer to decrypt the second key P using his distribution key D before the session key S can be recovered for decrypting the information signal. Thus a first decryption circuit 20 responsive to distribution key D is provided for decrypting the second key P and a second decryption circuit 21 responsive to the second key P is provided for decrypting the session key S which is then used in a third decryption circuit 23 for decrypting the information signal A.

Different customers may require different entitlements to the service. Furthermore, the entitlement may take different forms, e.g. a simple indication of whether a basic subscription has been paid or note, or they may indicate an over-air credit payment or they may simply indicate a tier level to which the viewer subscribes. The entitlements are represented by a small number of bits which are preferably sent together with the period key (P) in a shared cipher text block. The example described below makes use of the entitlement bits for tiering. However, the mode of use of the entitlement bits does not affect the principle of showing a distribution key and an encrypted cipher text block together between a plurality of viewers.

The tiering level of the signal (Ts) is sent with the session key. The tiering level requested by the customer (Tc) is sent to him with the period key using his distribution key. The security device compares Ts and Tc and decides whether the session key can be released for the purpose of deciphering the television signal (A).

The session key (S) is used to encipher the television signal. It is sent together with the tiering level of the programme (Ts) by encrypting these signals with the period key $P(T_s+S+P)$. The reason for duplicating the period key (P) in the message, before encryption with the same key P, will be described later. More than one session key may be sent if more than one operator is broadcasting simultaneously on the same satellite signal. This may happen for instance if one operator provides the television programme and another organisation provides a data service. (The symbol '+' means that the bits of the signals are appended together.)

The main problem with this system is the time taken to send the signal $D(Tc+P)$ to each customer. If a unique key D is defined for each subscriber the cycle time of this validation signal, after error correction has been applied, can take many hours.

We propose reducing the validation cycle time by sharing the same distribution key D between a number of customers. This still offers excellent system security since, if the number of customers sharing the same key is small, the probability of finding another customer with the same key as ones own is tiny. For example, if 20 customers share each key and there are 20 million subscribers in the system, the probability of finding another customer with the same key as ones own is $10^{-6}$. In fact some 1000 customers could share the same key with negligible effect upon the system security.

Figure 2:
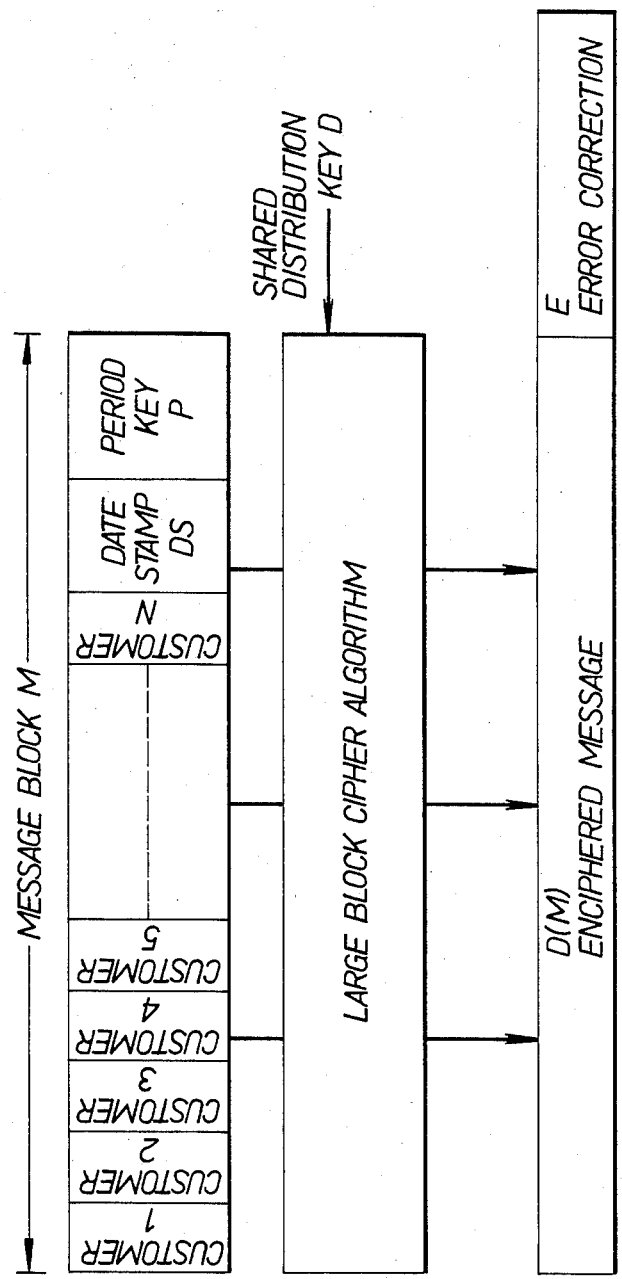
FIG. 2 shows the structure of one part of one of the signals sent in the system shown in FIG. 1.

We propose to send the period key and the entitlement signals indicative of each of a plurality of subscribers in one block as shown in FIG. 2. In the numerical example shown below a block size of 510 bits is used.

A BCH error correcting code is defined by the block to allow correct reception at a specified bit error rate. The BCH code requires several bits within the block to be used for error correction leaving the remainder for use as a message which contains the following information:

(i) A period key of about 56 bits. The period key bits could be evenly distributed throughout the message block. However, this is not really necessary because of the nature of the block encryption algorithm which is used.

(ii) A byte of about 8 bits for each customer in the block. A number of customers have bytes in the one block. The following represents an example of the proposal.
(i) no. of bits per block: $N=510$
(ii) no. of bits for error correction: $E=136$
(iii) no. of bits for the message: $M=374$
(iv) no. of bits for period key: $P=56$ With this arrangement if each customer used 8 bits then 46 customers could each share the block. In practice a mode word of 6 bits and a date stamp of 24 bits is also included which is shared by the plurality of customers. This allows 36 customers to share the block which gives a cycle time of 10 minutes for 15 million subscribers when a data rate of about 350K Bits/sec is used. However, the technique may be generalised to any number of bits.

The block is encrypted using an algorithm which has the properties of error extensions. Such an algorithm can be constructed from a block or feedback cipher arrangement which has the property that if one bit of the cipher text is falsified the resulting plain text message will loock look completely random even when the correct distribution key is used to decrypt the block.

This also means that there does not exist a unique set of 56 bits in the ciphered message to which the distribution key could be applied in order to recover the period key. In order to find the period key, without knowledge of the distribution key, either an exhaustive search of the 374 bits is needed or the encryption algorithm needs to be broken. After deciphering the message, each security device looks in the correct place within the block for the customer entitlement bits that are intended for that receiver. Clearly this function must be buried in the security device along with the distribution key.

The block or feedback cipher should have the following property. If one bit of the cipher text is altered, a number of bits of the plain text will be altered, under the same key, and these altered bits will be evenly distributed over the plain text message.

Figure 3A:
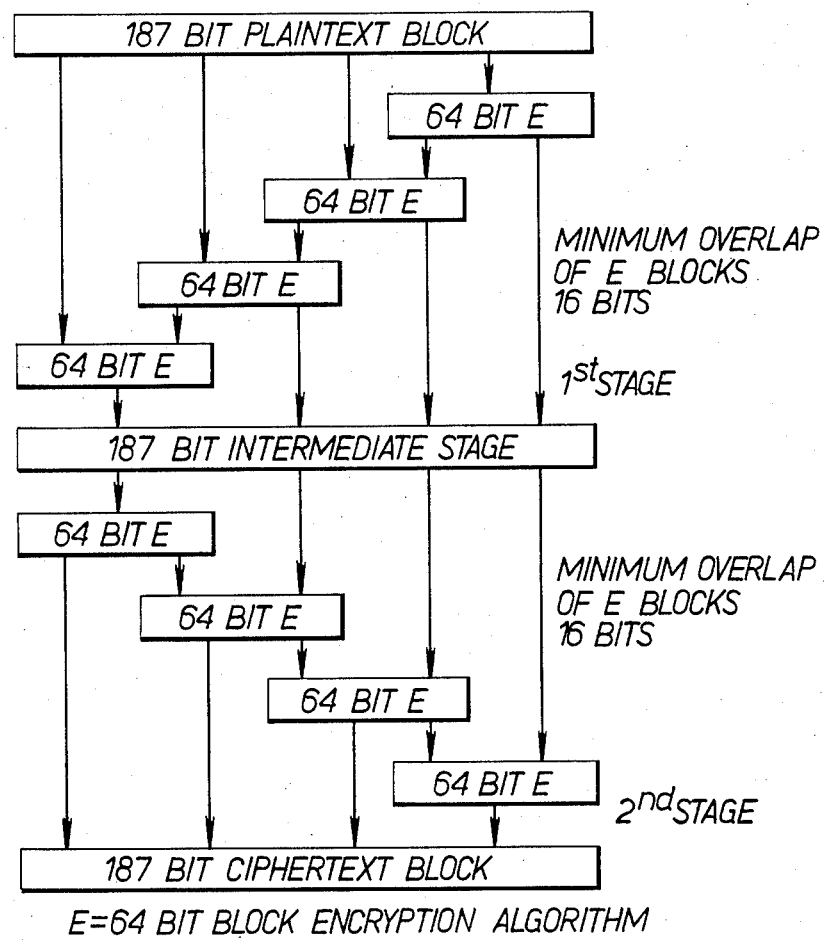
FIGS. 3a and 3b show diagrammatically two ways of implementing a part of FIG. 2.

FIG. 3a shows schematically how long blocks may be ciphered using a number of 64 bit sub-blocks. Each sub-block is a 64 bit block cipher.

Figure 3B:
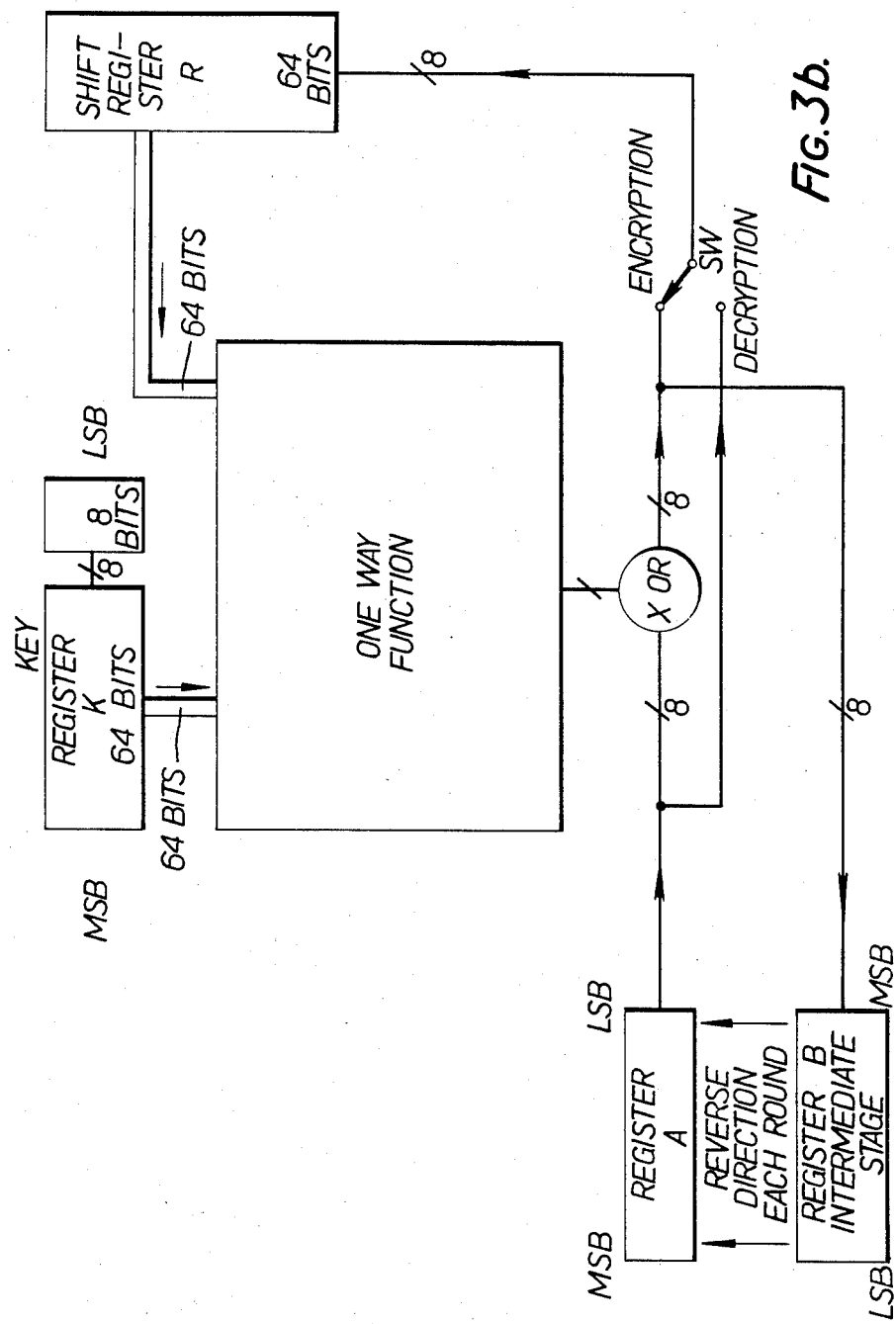
Figure 4:
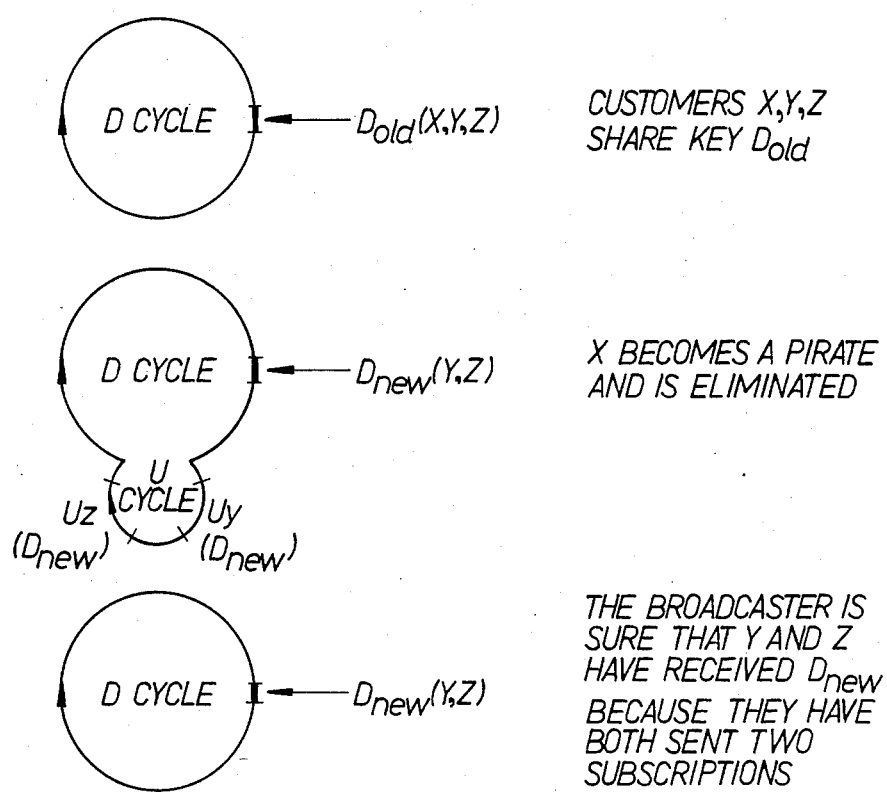
FIG. 4 shows a method of replacing shared distribution keys.

The essential features is to overlap the sub-blocks and form an intermediate stage. The final cipher text block is guaranteed to have the properties described above by *reversing* the direction in which the sub-blocks are overlapped during the second stage. The same technique of forming an intermediate stage and reversing the direction in which the algorithm is performed for the second stage can be applied to cipher feed back in order to achieve the necessary cipher text properties. Cipher feedback is a well known technique and the technique of reciphering the cipher text in the reverse direction is shown in FIG. 3b.

The proposed system of sharing a distribution key between several subscribers suffers from the problem that if one customer becomes a pirate, removal of the key affects the other customers who also share that key. There are basically two methods of overcoming this problem which are described below.

Instead of storing just one secret distribution key, each customer has a plurality of keys e.g. two, stored in his receiver. The first key would be common to a first set of customers while the second key would be common to a second set of customers. One one member of the first set can be in the second set. Each customer is then given a unique combination of two keys from the total number of keys available. The total number of combinations far exceeds the total number of keys available.

A pirate is eliminated by removing both of his keys from the cycle. Since the customers who share his two keys all have another but different key remaining, they are able to continue. This results from the fact that the pirate is the only customer who is a member of both shared key sets.

It can be shown mathematically, that because the number of combinations is huge, the probability of disabling honest customers after many pirate combinations have been removed is small.

Instead of storing two distribution keys which are both shared, two keys may be stored via the receiver and used in the following way.

The first key is the shared distribution key and the second is a unique key which is not shared and it is different for each customer. When a pirate is detected a new shared distribution key ($D_{NEW}$) is sent to each of the remaining honest customers by encrypting it with their personal Unique key (U); see FIG. 3. Hence if X, Y and Z share a block which is normally encrypted with the shared Distribution key ($D_{OLD}$) and X becomes a pirate; customers Y and Z are send $D_{NEW}$ by transmitting $U_Y(D_{NEW})$ and $U_Z(D_{NEW})$. Clearly the format for the transmission of U(D) is much less efficient than the shared distribution key cycle D(M+P) but this is not important because the second cycle only includes a very small number of customers. A broadcaster can be sure that his customer has received this new shared distribution key (D) by transmitting the U(D) signal until his customer has returned say two subscription payments. Since the cycle time of the U(D) signals will be very small, probably less than one minute, and because the customer has returned more than one subscription payment—the broadcaster can be confident that his customer will have received the new shared key. This confidence relies upon the assumption that each subscriber will be watching television for more than one minute during a subscription period for which he has paid.

The idea of transmitting a small U(D) cycle for a long period of time allows the cycle time/data capacity to expand to cater for an emergency update and then contract again afterwards. Hence the average cycle time/data capacity stays approximately constant during the lifetime of the system; it is illustrated in FIG. 3. In order to maximise the efficiency of the system the same technique can be applied to reconfigure into new shared blocks those customers who have become the only members of an old shared block. This is achieved by sending new addresses to old customers using the same method described above.

The information that is contained within the encrypted block not only contains the new shared distribution key D and the new address (a), but also the U key. The encrypted block then takes the form U(D+a+U). The U key is sent in the encrypted block for the purpose of checking that the information has been received correctly. Provided that the secret U key is also found in the message after decryption, the remainder of the information is accepted.

The above described system makes use of storing of the secret distribution keys in a user held security device. Since the copying of the contents of the security device is likely to represent a weak link in the system, re-issue of the security device from time to time might be required by the broadcaster. Therefore, an alternative approach is to mount the security device in such a way that is can be re-issued periodically at little expense. Such a device could be a security microprocessor mount in a SMART card.

If it is required to remove a key before the re-issue date, the broadcaster simply contacts the other customers who share that key and sends them a new SMART card. Since the number of customers who share the removed key is very small (approx. 36) this practice unlikely to cause much of a problem. Furthermore, the broadcaster might offer one month's free viewing to compensate for the inconvenience caused to the honest key holders.

Modifications to the above described system may be made which will improve the practicality of the system. For example, the period key that is sent in the validation cycle may be the key for the next period. Although this key may be received quickly it should not be able to be used straight away. This would mean that a new customer may have to wait for several weeks before he could receive television programmes. In order to overcome this problem the current period key is sent encrypted with the next period key—$P_{NEXT}(P_{CURRENT})$. Provided the customer is permitted to receive programme during the next month, say, he may begin viewing from the time he has received his validation signal.

A further modification is to send a known code encrypted with the period key. This signal is useful for the purpose of deciding whether the period key has been received correctly and that the encrypted block has not been falsified. The code could be made secret by using the period key for the special code. The receiver finds a binary word that it thinks is the period key by decrypting the signal $D(T_c+P)$. Provided the period key P has been received without error, using it to decrypt the signal P(P) or $P(T_s+S+P)$ will reveal the same period key P. this can be checked by comparing the received P key value with the value of the P key contained in the message $T_s+S+P$. If the comparison is negative the receiver makes the decision to interrogate the address cycle again. The check also ensures that the signal $P(T_s+S+P)$ as well as the signal $P(T_c+P)$ is a valid signal.

The encryption system signals may be formatted into a data frame in a packet system such as is proposed for the sound for the European Satellite Broadcast signal standard. A sync word and address word are needed to locate the various signals. the security device uses the address word to find the particular 510 bit block, in the long validation cycle, that is intended for that receiver.

A method of synchronising the key changes may be achieved in a packet multiplexing system by having two signals. The first is a frame counter on line 625 which represents a clock. Keys arrive asynchronously and are changed during line 625 at specified times. A second signal is sent in the packet multiplex which labels the transmitted keys with the time that they are to be activated. An alternative approach, which eliminates the need for a time label, is to transmit the keys synchronously with the television signal. There are two keys that need to be changed—the period key and the session key.

What is claimed is:

1. Apparatus for transmitting a scrambled information signal, togther with a key required at a receiver to enable descrambling of the scrambled information signal to occur, to entitled receivers, comprising:
   means for scrambling an input information signal A to produce a scrambled information signal S(A);
   means for generating a first encryption key P required at a receiver to enable descrambling of the scrambled information signal S(A) to occur;
   means for defining groups of entitled receivers;
   means for generating a plurality of distribution keys D, each distribution key being generated for a particular group of entitled receivers;
   means for generating a plurality of receiver entitlement signals $T_C$, each receiver entitlement signal being representative of the level of entitlement of a respective receiver to descramble scrambled information signals;
   means for assembling data blocks, adapted to assemble for each group of entitled receivers a data block comprising the first encryption key P appended to the receiver entitlement signals $T_C$ for the receivers in the respective group, the receiver entitlement signal $T_C$ for a particular receiver in a group being included in the respective data block at a predetermined location therein;
   first encryption means for encrypting each data block using one of the distribution keys, the first encryption means being adapted to encrypt a data block relating to a given group of entitled receivers using a particular distribution key to enable the receivers in a group to use the same particular distribution key to recover the first encryption key P; and
   means for transmitting the scrambled information signal S(A) and the encrypted data blocks.

2. Apparatus according to claim 1, wherein the data block assembling means is adapted to assemble a data block omitting a receiver entitlement signal in respect of a first receiver belonging to the group to which the data blcok relates when said receiver is no longer entitled to recover the information signal A; and
   the first encryption means is adapted to encrypt data blocks relating to said group but omitting a receiver entitlement signal in respect of said first receiver using a distribution key $D_{NEW}$ different from that used to encrypt data blocks relating to said group but including a receiver entitlement signal in respect of said first receiver.

3. Apparatus according to claim 2, and comprising means for producing a unique key U for each receiver, second encryption means for encrypting distribution keys D, one at a time, using said unique keys U, one at a time, and means for transmitting the encrypted distribution keys U(D); wherein the second encryption means is arranged to encrypt a distribution key $D_{NEW}$ a plurality of times using each of a plurality of unique keys U in turn, the plurality of unique keys U relating to entitled receivers in a group omitting a first receiver no longer entitled to recover the information signal A, when the distribution key $D_{NEW}$ is used by the first encryption means to encrypt a data block relating to said group but omitting a receiver entitlement signal in respect of said first receiver.

4. Apparatus according to claim 1, wherein the algorithm used in the encryption means has the property that if any part of the encrypted signal is altered an approximately random decrypted signal results when the encrypted signal is decrypted with the correct distribution key to make any of the received signals useless.

5. Apparatus according to claim 1, further comprising means for generating a second encryption key S, third encryption means for encrypting the second encryption key S using the first encryption key P, and means for transmitting the encrypted second encryption key P(S), and wherein the means for scrambling the input information signal uses the second encryption key S to control the scrambling of the information signal.

6. Apparatus according to claim 5, wherein the means for generating a second encryption key S is arranged to alter the second encryption key S at a first frequency and the means for generating a first encryption key P is arranged to alter the first encryption key at a second frequency lower than the first frequency.

7. Apparatus according to claim 5, further comprising means for generating signals $T_S$ indicative of a parameter of the input information signal, said third encryption means encrypts said signals $T_S$, either alone or appended to the second encryption key S, using the first encryption key P, and the means for transmitting the encrypted second encryption key S transmits the encrypted $T_S$ signals.

8. Apparatus according to claim 6, further comprising means for generating signals $T_S$ indicative of a parameter of the input information signal, said third encryption means encrypts said signals $T_S$, either alone or appended to the second encryption key S, using the first encryption key P, and the means for transmitting the encrypted second encryption key S transmits the encrypted $T_S$ signals.

9. Apparatus according to claim 7, further comprising means for generating a CODE signal, and wherein said third encryption means encrypts said CODE signal, either alone or appended to a signal or encryption key generated in the transmitter, using the first encryption key P, and the means for transmitting the second encrypted key transmits the encrypted CODE signal.

10. Apparatus according to claim 8, further comprising means for generating a CODE signal, and wherein said third encryption means encrypts said CODE signal, either alone or appended to a signal or encryption key generated in the transmitter, using the first encryption key P, and the means for transmitting the second encrypted key transmits the encrypted CODE signal.

11. Apparatus according to claim 9, wherein the means for generating a CODE signal is the means for generating the first encryption key P.

12. Apparatus according to claim 10, wherein the means for generating a CODE signal is the means for generating the first encryption key P.

13. Receiving apparatus, comprising:
   means for receiving a scrambled information signal S(A);

means for storing a distribution key D;

means for receiving a further signal comprising a data block encrypted by the distribution key D, the data block containing the first encryption key P appended to a plurality of receiver entitlement signals $T_C$ each representative of the level of entitlement of a respective receiver to descramble scrambled information signals;

first decryption means for decrypting the received further signal using the distribution key D stored in the storing means;

means operative on the output from the first decryption means for extracting a receiver entitlement signal from a predetermined location in the decrypted data block; and descrambling means for descrambling the received scrambled information signal S(A) in response to the correct recovery of the first encryption key P from the output of the first decryption means.

14. Apparatus according to claim 13, wherein an encryption key U unique to the receiver is also stored therein, and comprising means for receiving a third signal comprising a new distribution key $D_{NEW}$ encrypted by the unique key U, second decryption means for decrypting the encrypted new distribution key U($D_{NEW}$) using the stored unique key U, and means for replacing the distribution key D stored in the receiver by the recovered new distribution key $D_{NEW}$.

15. Apparatus according to claim 13, wherein a plurality of different distribution keys D are stored in the receiver and the first decryption means uses one of the plurality of distribution keys to decrypt the received further signal.

16. Apparatus according to claim 13, further comprising means for receiving a fourth signal comprising a transmitted second encryption key S encrypted by the first encryption key P, and third decryption means for decrypting the encrypted second encryption key using the first encryption key P recovered by the first decryption means, and wherein the descrambling means descrambles the received scrambled information signal under the control of the recovered second encryption key S.

17. Apparatus according to claim 16, further comprising means for receiving a signal $T_s$ encrypted by the first encryption key P, said signal $T_s$ being indicative of a parameter of the transmitted information signal, and wherein the third decryption means decrypts the received encrypted signal $T_s$, and further comprising comparison means for comparing the recovered signal $T_s$ indicative of a parameter of the transmitted information signal with the recovered receiver entitlement signal $T_c$ and for gating the application of the second encryption key S to the descrambling means in accordance with the result of the comparison.

18. Apparatus according to claim 17, wherein the first decryption means outputs the recovered receiver entitlement signal $T_c$ into a storage means, and the third decryption means outputs the recovered signal $T_s$ to said storage means to cause the contents thereof to be altered.

19. Apparatus according to claim 13, wherein the third decryption means recovers a CODE signal from the signals decrypted and using the first encryption key P recovered by the first decryption means, and further comprising monitoring means for checking that the recovered CODE signal is the same as a predetermined signal and for disabling the descrambling means as a result of determining that the CODE signal is not the same as the predetermined signal to prevent descrambling of the received information signal if the signals decrypted by the first or third decryption means have been falsified.

20. Apparatus according to claim 19, wherein the CODE signal is the first encryption key P.

21. Apparatus according to claim 13, wherein the distribution key D stored in the receiver is contained in circuitry permanently associated with the first decryption means.

22. Apparatus according to claim 13, wherein the distribution key D stored in the receiver is contained in a module which is removable from the receiver.

23. Apparatus according to claim 13, wherein the algorithm used in the encryption means has the property that if any part of the encrypted signal is altered an approximately random decrypted signal results when the encrypted signal is decrypted with the correct distribution key to make any of the received signals useless.

* * * * *